FIG. 1

INVENTORS
HOWARD B. CUMMINGS
RALPH GIBSON
BY
[signature]
Attorney

INVENTORS
HOWARD B. CUMMINGS
RALPH GIBSON
BY
Attorney

INVENTORS
HOWARD B. CUMMINGS
RALPH GIBSON
BY
Henry L. Burkitt
Attorney 3,510,324
Patented May 5, 1970

3,510,324
GLAZE COMPOSITIONS FOR FAST FIRING
Howard B. Cummings and Ralph Gibson, New Castle,
Pa., assignors, by mesne assignments, to Interspace Corporation, Parsippany, N.J., a corporation of Delaware
Continuation-in-part of application Ser. No. 231,714,
Oct. 19, 1962. This application Nov. 23, 1965, Ser.
No. 509,378
Int. Cl. C03c 5/02
U.S. Cl. 106—49            4 Claims

ABSTRACT OF THE DISCLOSURE

The invention here deals with a glaze composition for use in producing a transparent glaze on ceramic bodies where the decoration is under the glaze, and where such glaze is applied preliminarly to a "fast fire" glost firing. The composition requires the presence of compounds based on the oxides of calcium, barium, strontium and aluminium, as well as the presence of a fluoride selected from a group consisting of the alkaline earth fluorides, the alkaline earth silico-fluorides, and potassium fluoride. In more specific aspects, alumina is present in the formula in a small fraction of the amount of silica present. Certain empirical formulae have been determined.

---

This application is a continuation-in-part of application, Ser. No. 231,714, filed Oct. 19, 1962, now abandoned. In this application, there will be presented claims to the subject matter in the specific formulae of the glaze which may function generally, but are specifically adapted for obtaining the desired relationship between the "fit" of the body and the glaze. In another application, filed simultaneously with the filing of this application, that application having received Ser. No. 509,331, and having since issued as Letters Patent No. 3,403,047, on Sept. 24, 1968, there were presented claims for the subject matter in the relationship between the "fit" of the body and the glaze.

In some of its details, the invention here may be applied by the use of features described in the application of David E. Tomkins, Ser. No. 95,192, filed Mar. 31, 1961, now U.S. Pat. No. 3,271,487. In those respects where the invention is claimed in that application, no claim will be made herein. That application, and Letters Patent No. 2,974,387, issued Mar. 14, 1961, on an application of said David E. Tomkins, are concerned with a process of what may be termed "fast firing" of ceramic articles, that is, the time for the production of ceramic articles, at least for maturing the glaze in the glost fire, has been reduced radically. Thus, where many hours are consumed in the usual operations of glost firing, the time interval for maturing the glaze, in the process here to be considered, has been reduced sharply, varying, of course, according to the size of the article being fired. In a number of cases, the time for such firing has been reduced to the neighborhood of one hour, possibly less.

While consideration here is addressed mainly to the production of ceramic articles in the categories of "china bodies," the invention may have more general application. The invention here is concerned both with product and process.

In applying the features of the invention here to the "fast firing" of the application for Letters Patent Ser. No. 95,192, and the Letters Patent referred to, results were produced which were unexpected and in addition to the resulting reduction of time for the glost fire. One element of the invention was to relate components of a certain composition for the body of the ceramic articles for what is known as the bisque stage, to certain components of the composition of the glaze, and then to utilize the fast fire to mature the glaze in the glost firing of such bisque bodies to which such glaze composition had been applied. One result was that losses by reason of rejections, as well as by reason of other factors, were strikingly reduced. One goal sought, to obtain good colors by means of underglaze coloring, was attained, while greater efficiency in production and reduction in losses were concomitant results.

Another important factor arose from the fact that it became possible to mature the glaze at a temperature in the glost fire lower than that usually necessary for ceramic bodies.

Research in connection with the use of the fast fire for the glost firing led to changes in operation and formulation from which flowed results which in some measure ran contrary to the accepted results in usual practice. Usually, gradual heating and gradual cooling are considered essential for the proper production of ceramic ware. The combination of the fast fire with these changes has made it possible to heat such ceramic articles to the maturing temperature very rapidly, and then, after the articles have attained this maturing temperature, to turn around and then without the usual careful and slow cooling, bring the temperature down. For this last, any suitable process or or means may be applied to obtain quick cooling. For instance, air, either at room temperature or at any temperature sharply lower than the peak high temperature of the kiln, may be caused to move over the articles immediately after they had been brought up to the maturing temperature for the glaze. A result projected from such reduction in temperature at this stage is increased flexural strength for the ceramic pieces, with associated increase in resistance to destruction by forces such as impact, chipping, or the like.

For certain purposes, a body to produce the bisque for the ceramic article was prepared from a composition in which were utilized certain ingredients to cooperate in attaining the results here sought. Such body was fired in any suitable or usual manner. Those certain ingredients for the body were ascertained to have a specific relation to the ingredients of the glaze composition to be used for this ceramic article. The ingredients of the body for the bisque were determined so that, when the bisque, with the glaze applied thereto, was heated in the glost fire, the coefficient of thermal expansion would be such as properly to relate to and coordinate with the coefficient of thermal expansion of the glaze. By means of control of the ingredients of the glaze, the coefficient of expansion of the glaze is brought into a range to accommodate itself to the coefficient of expansion of the association of element in the bisque body at this glost fire stage so that these two compositions may provide good glaze "fit."

In light of this time interval and the necessary rapid increase and decrease in temperature in that interval, a necessary consideration in the manufacture of such ceramic bodies, the main categories of which are designated as "chinaware," is the phase change of silica present as free quarts which forms a major ingredient of all such bodies. Free quartz, in the normal processing of china manufacture, undergoes crystal changes, on heating and cooling, which account for large volumetric changes, by expansion and contraction. It thus becomes important to be able to bring the body being glazed through the phase change temperature in reaching for the glazing temperature, and down again through that phase change temperature, at the rapid pace of fast firing, while minimizing the disruptive action of these crystal changes in the quartz constituent.

For various reasons, it is sought to effect correlation between the expansions of body and glaze at as low a temperature as possible. Thus, the body of the china or ceramic piece is made by associating the determined ingredients, which are then worked and thereafter formed to the shape of the piece to be manufactured. This forming may follow any method well known in the art. The formed piece may be dried, and then fired to produce the intermediate body generally known as the bisque.

In processing such as here considered, the ornamentation is applied to the bisque body thus produced by any suitable method; then the glaze ingredients are applied in the usual sequence and at the usually necessary spaced intervals. The application of the glaze is effected after the application of the ornamentation so that the glaze coating will be externally of the ornamentation. In the final product, the ornamentation will be visible through the glaze if the glaze is transparent.

The development did not consist merely in raising the coefficient of expansion of the bisque body, since this would merely introduce losses from excessive thermal shock. Thus increase of the coefficient of expansion of the bisque body had to be held in check and to be correlated to a change in the coefficient expansion of the glaze. All of this had to follow while the glaze attained a suitable gloss within the limited time of the cycle of the fast fire, which had been sharply reduced, as, for instance, in some cases, to one hour, and by various modifications, even further.

A glaze such as here sought is required, in the final product, to have hardness sufficient to withstand normal usage to which the ceramic product will be subjected. For commercial purposes, such glaze must be transparent, especially where underglaze decoration is to be used. Yet such glaze must permit only low lead release during use of the product, in order to prevent toxicity, particularly where such product is used in connection with food. Crazing in the final product must be avoided. There is the problem that sufficient work must be done on the glaze in the time of the fast fire to mature it. Yet the ware must be capable of glazing at a temperature sufficiently low to prevent warpage, and this temperature preferably is lower than the maturing temperature for the firing in which the bisque was produced. For practical purposes in the case of general chinaware, a maturing temperature for the glost fire of about 2100° F. was set as desirable. For these reasons, a balance of ingredients, including fluxes, must be provided to mature in the short time of maintaining the ware at the maturing temperature.

In effectuating the change in the coefficient of thermal expansion of the body, it was found that a small percentage of the total ingredients by weight used in making the body would function to produce this result. For instance, this small percentage of ingredients, somewhere in the neighborhood of 3.5% of the total weight of the ingredients used to make up the body, included a non-silicate flux, and a silicate flux. The relationship of these two fluxes, within that small percentage, was found to determine the final characteristics of the body as to its coefficient of thermal expansion. For instance, one non-silicate flux used was calcium carbonate. With this would then be used a silicate flux such as talc or lithium silicates. It has been found that, by this combining, in relation to a glass former such as feldspar, a resultant change in the coefficient of thermal expansion of the body is obtained which will "fit" the glaze, that is, that the glaze on the body will have substantially the same or a lesser rate of contraction as relates to that of the body so that, as they cool, the undesirable results of crazing or the like are eliminated since the glaze will be brought to the desired state of compression during such cooling.

It is an object of the invention to provide a process for the manufacture of ceramic articles by fast firing a glazed body wherein the compositions of the body for the bisque and of the glaze are related so that, at the temperature and in the time of the cycle of fast firing, the expansion of the bisque body and the expansion of the glaze will be correlated so that a transparent glaze will be produced satisfactorily to cooperate with underglaze decoration, and so that failures arising from thermal shock in the final product may be eliminated or minimized as important considerations in the final product.

It is an object of the invention to provide a product of a process wherein the product results from utilization of a fast firing process into which process are integrated a bisque body and a glaze for that body wherein their respective ingredients are interrelated so that, in the final product, the glaze is over the decoration and is transparent, and crazing of the glaze is avoided.

It is an object of the invention to interrelate, for a process of fast firing, the ingredients of the composition of the bisque, and of the composition of the glaze, so that they cooperate with each other in their degrees of expansion to permit fast heating and fast cooling of the glazed articles and yet sharply to reduce losses and to increase structural strength in the final product.

It is an object of the invention to provide, for the production of a body to "fit" a glaze for fast firing, a combination of ingredients wherein a non-silicate flux and a silicate flux are balanced with relation to each other, but each in very small amounts, so that the effect of these fluxes in connection with a glass former will produce an increase in the coefficient of thermal expansion so that, after application of the glaze and after the glost firing, and then in cooling the body, the body and glaze will contract at a rate such that undesirable features as crazing will be eliminated.

It is an object of the invention to provide, in connection with a process of fast firing ceramic articles substantially to peak maturing temperature, fast cooling the pieces wherein thermal conditioning of the articles results in increasing resistance to forces such as impact, chipping, and the like.

It is an object of the invention to provide a process of fast firing involving rapidly raising the ceramic article being processed to the predetermined maturing temperature, and then, after a relatively short period of heating at this maturing temperature, quickly bringing the temperature down, and increasing the strength of the piece and its resistance to mechanical abuse.

Other objects of the invention will be set forth hereinafter, or will be apparent from the description and the drawings, in which is illustrated apparatus for carrying out certain details of the invention.

The invention, however, is not intended to be restricted to any particular product or any particular apparatus, or any particular application of such apparatus, or any specific process, or method of operation or use, or any of the various details thereof, even where specifically shown or described herein, as the same may be modified in various particulars, or may be applied in many varied relations, without departing from the spirit and scope of the claimed invention, of which the exemplifying disclosure is intended only to be illustrative, and only for the purpose of complying with the requirements of the statutes for disclosure of an operative embodiment, but not to show all the various forms and modifications in which the invention might be embodied.

On the drawings, in which the same reference characters refer to the same parts throughout, and in which is disclosed such a practical construction.

Figure 1:
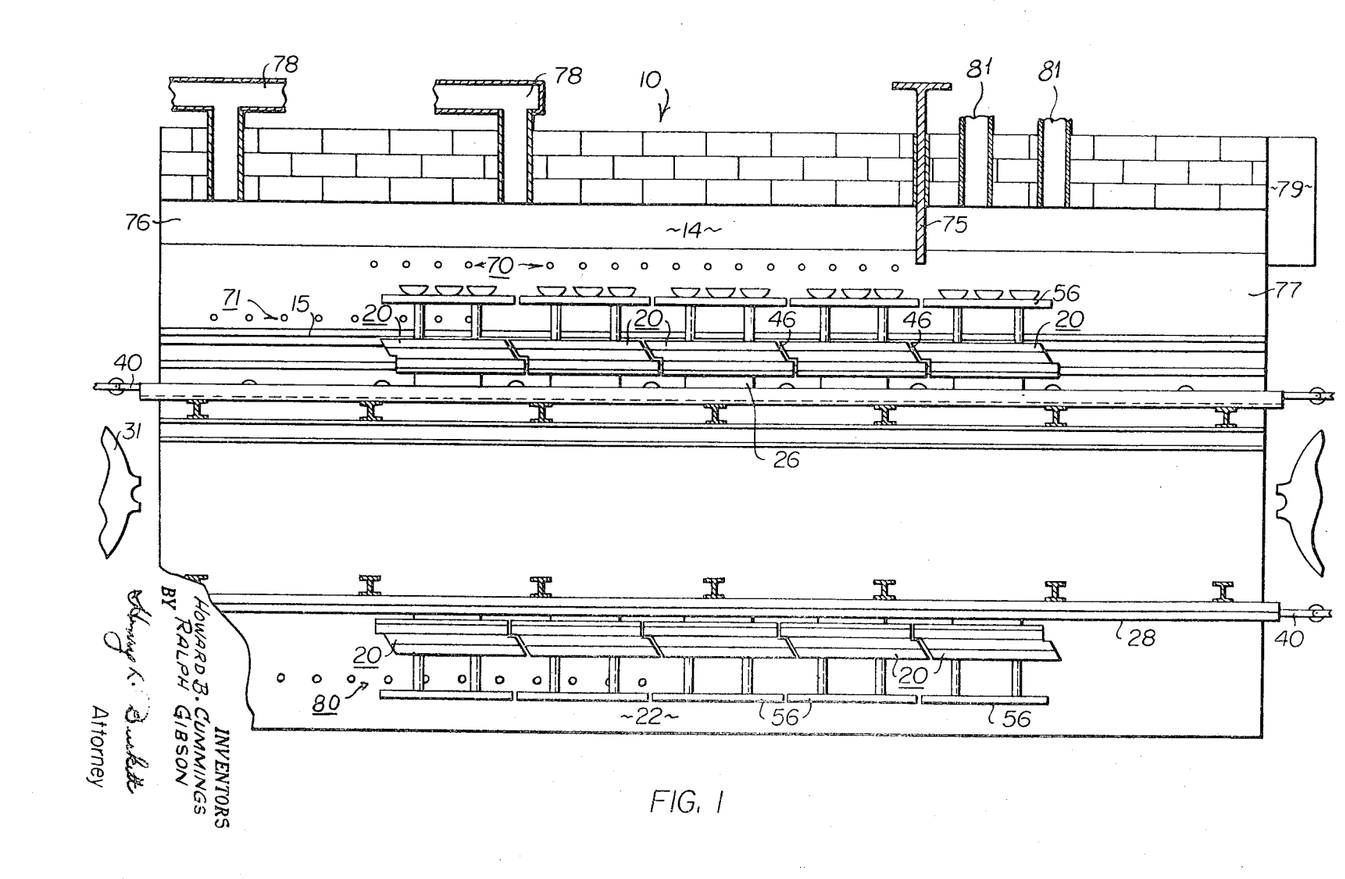
FIG. 1 is a schematic, vertical sectional view of a kiln constructed to apply the invention.
Figure 3:
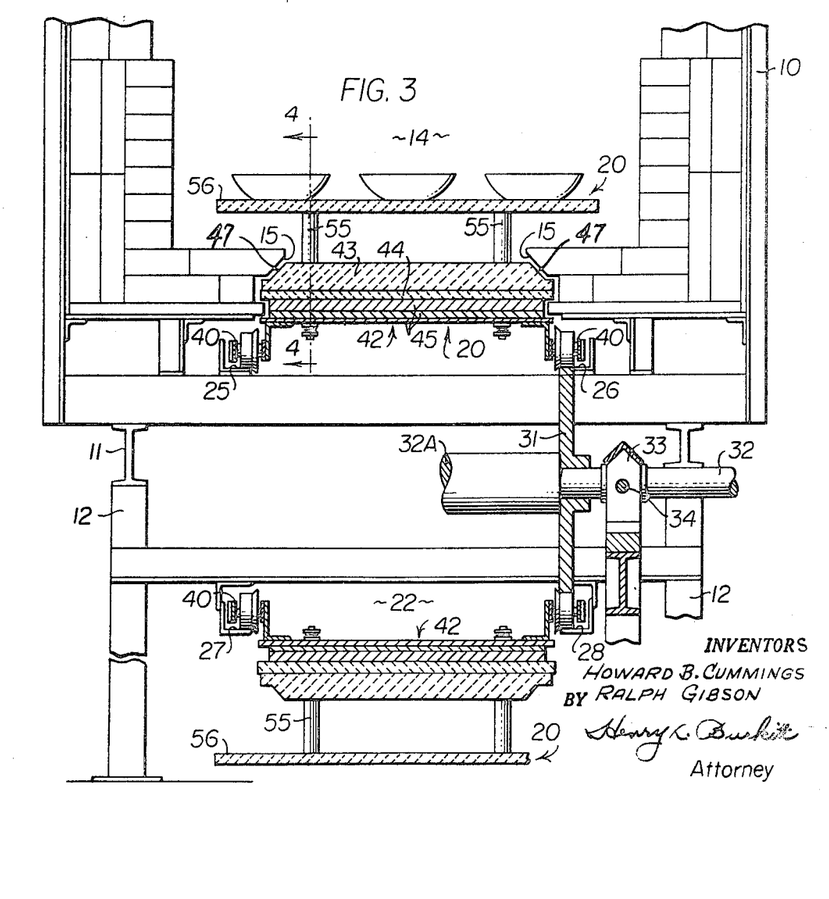
FIG. 3 is a fragmentary sectional elevation, partially broken away, taken from the plane of the line 3—3 of FIG. 2.

For simplification, it is noted that one set of apparatus capable of use in effectuating certain purposes of the invention is described substantially in said application of Tomkins, Ser. No. 95,192. It is, however, not intended that the use of the invention be limited thereto. Indeed, modifications in the Tomkins apparatus have been found possible and in some cases desirable. On the drawings, there is shown a straight tunnel kiln 10 which may be lined with suitable refractory material (FIGS. 1 and 3). Kiln 10 may be supported by suitable means such as frame members 11 and 12. A suitable shielding wall 13 may be provided. The kiln has a tunnel 14 at the bottom of which is an open slot 15. Cars 20, when moved through the tunnel, serve to close this slot.

In the illustration here, cars 20 are shown as linked together by means of a continuous chain belt. This construction is merely an illustration of one method of operation. Other methods are available. For instance, the cars may be disposed as pallets to be pushed through the tunnel. Such pallets may be disposed in any suitable manner, as, for instance, as separate wheeled vehicles, or upon suitable skids. In any case, they may be moved through the tunnel in any suitable manner. For instance, the cars may be pushed by a plunger or other suitable means acting upon a car externally of the kiln to push it into the kiln and against other cars already in the kiln, and thus to propel all the cars in the kiln through the various zones of the kiln.

Where the cars are linked together as shown here, they may be entrained and guided along slot 15. At the end of tunnel 14, the cars may be carried by a chain belt to be described, so as to be inverted for movement through a return reach 22 immediately below slot 15. In tunnel 14, an upper railway for the wheels of the cars may be provided by rails 25 and 26. A lower railway in the return reach may be located directly below the upper railway, and may include rails 27 and 28.

Figure 2:
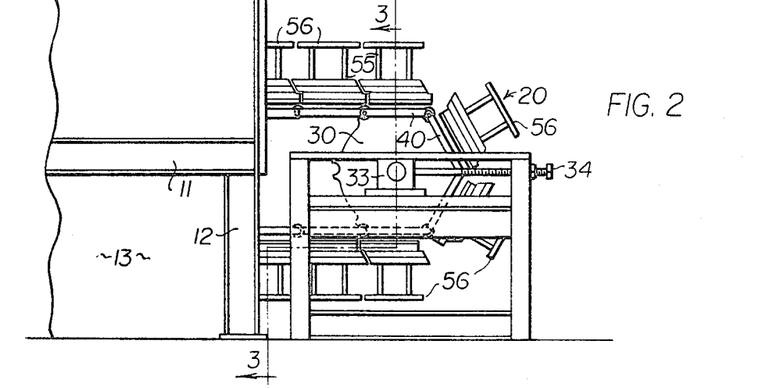
FIG. 2 is a side elevation of one end of the straight tunnel kiln, shown in FIG. 1.

In the embodiment shown, movement of the cars is effected by means of a chain system including sprockets. As here shown, the rails of the railways, if extended, would be tangent to the effective circles of the sprockets. The sprockets are large enough to extend from one level to the other of the two railways. Thus, sprocket 30 (FIG. 2) extends between the levels of upper and lower rails 25 and 27, while sprocket 31 extends between the levels of upper and lower rails 26 and 28. Sprockets 30 and 31 may be fixed to rotate with a drive shaft 32, 32A, to which power may be delivered in any suitable manner from a suitable power means, such as a motor (not shown). Shaft 32, 32A, may be mounted in pillow blocks 33 which, by adjusting means such as screws 34, may be effective for adjusting the effective length of the chain formed by links 40, as tension varies owing to changes of temperature, or for other reasons.

The other end of tunnel 14 is not shown; it may be a duplicate substantially of the structure just described, with the exception that the sprocket shaft and the sprockets at that position may function as idlers. In such case, a single set of adjusting screws 34 at one end may suffice for the entire chain. Links 40 of the chains, engaged with sprockets 30 and 31 and the other sprockets (now shown), may be secured by suitable means to the wheel axles of cars 20 (FIGS. 2 and 3), as, for instance, at the ends of those axles. In this manner, the cars may be linked together for movement as a unit; thus a single train extending along the lengths of the railways is formed. The manner of connecting the links to the cars provides means (FIG. 2) for pivoting the cars as they turn at the ends of the railways to move from one level to the other.

Each car may have a base portion 42 of such extent laterally substantially to close slot 15 at the position where the car is located when the car is moving through the slot. But slight clearance 47 is provided between base portion 42 and the side edges of the slot, thus effectively shielding against the transmission of radiant heat past the car from tunnel 14 to the lower reach. Base portion 42 may include a suitable deck which may be lined, on its upper side, with suitable ceramic material 43, 44. The lower side of the deck may be defined by means such as metal portions 45. As described in Letters Patent No. 2,974,387, metal sleeve 50 may extend upwardly from metal portion 45 and through ceramic material 43, 44, of the deck.

Base 42, at the longitudinal ends, may be formed with overlapping edge portions 46 so that, for immediately adjacent cars, these ends may interlock, as it were, with very slight clearance as the cars are moved through the slot, and thus assist in forming a heat shield. Substantially the same result is attained whether the cars are pushed, or pulled through the tunnel 14 by a chain. When the cars are pushed, edge portions 46 may actually be, or come very close to being, in positive engagement with each other as each car pushes the car in front of it.

Each car may have a plurality of hollow ceramic columns 55 extending upwardly from its deck. These columns may be received within metal sleeves 50, may be rested on metal portions 45 (FIG. 4), and may extend upwardly from ceramic members 43 and 44 into tunnel 14. For each car, there is provided a ceramic platform 56 of such length that the end edges $56_1$ and $56_2$ of adjacent platforms are very closely adjacent each other as the cars move through the tunnel, further to assure against loss of utilizable radiant heat upon the ware on the platforms. Each platform is provided with sockets 57 (FIGS. 4 and 5) on its under side into which columns 55 are received loosely, to support the platform when the car is in the normal upright position of FIG. 4. Platforms 56 may have hollowed out portions 58 at their under sides, and raised portions 59 on their upper surfaces. These portions may take any suitable form, as, for instance, the diamond configuration shown, or any other configuration suitable for providing ridges 59 for supporting ware during heating. The platform may be made of material capable of being heated rapidly during the firing to be described, and likewise of being cooled rapidly, without substantial deterioration. Ware to be heated may be supported on ridges 59 so that the under face of an article to be heated will have radiant heat applied thereto during the firing, with effectively increased uniformity in heating of the body of the ware. The platform may be formed of low expansion ceramic material, to permit the rapid cooling and heating to be described.

Figure 4:
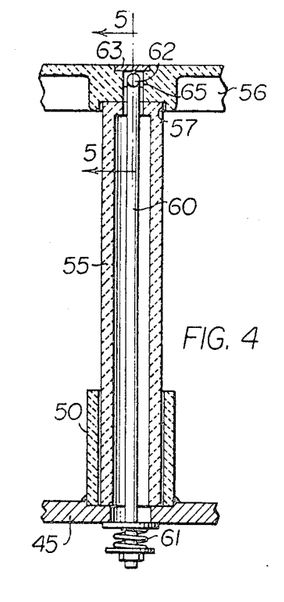
FIG. 4 is a further enlarged detail view, taken from the plane of line 4—4 of FIG. 3.
Figure 5:
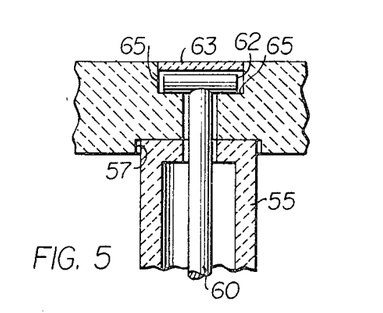
FIG. 5 is a view taken from the plane of line 5—5 of FIG. 4.
Figure 6:
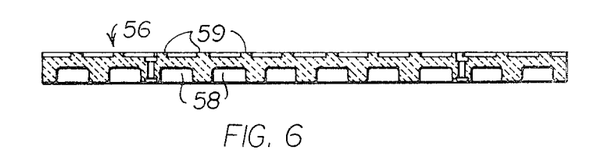
FIG. 6 is a vertical sectional view, taken in the plane of line 6—6 of FIG. 7.
Figures 7, 8:
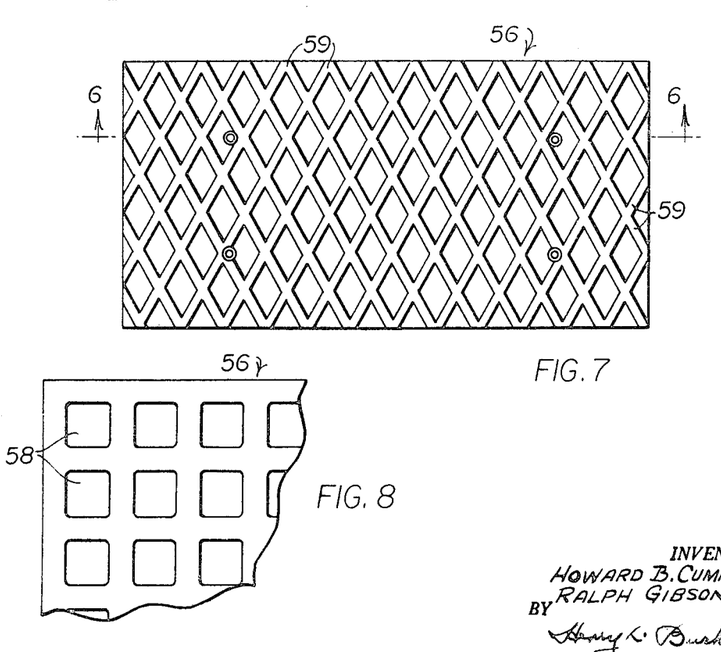
FIG. 7 is a top elevation of a portion of the kiln.
FIG. 8 is a bottom elevation of the part of the kiln shown in FIG. 7.

Tie rods 60 may extend through columns 55. By means such as T-shaped heads 62 (FIG. 5), the rods are retained to engage platform 56 at shoulders 65, and are suspended from platform 56. Heads 62 may be shielded from the heat of the fire by means such as a ceramic plug or insert 63. The tie rods extend downwardly through columns 55, by which they are protected from the heat of the fire when the cars move through tunnel 14. The rods then pass through openings in metal portions 45 (FIGS. 3 and 4). Suitable means, such as springs 61, may engage rods 60 at their lower ends and urge the rods downwardly. The spring ends straddle suitable means such as washers or the like which extend across the openings. The tension of the springs may be adjusted to assure that the columns will be maintained in an upright position when the platforms are loaded, and the cars are moving through tunnel 14. When the cars, in the arrangement shown, complete a passage through and reach the end of the tunnel, the cars are inverted so that the platforms now will be suspended; the weight of the platforms is now transferred to and is carried directly by the rods and the springs.

Suitable heating means may be provided for kiln 10. For instance, the fuel may be gas or oil; electric heating also may be utilized. Suitable temperature controls may be provided to regulate the heat being applied to the cars and the articles supported upon the platforms. In the showing here, the heating is shown as effected by the use of burners which may burn gas. A series of top burners 70 and a series of bottom burners 71 (FIG. 1) may be arranged so that the heat from top burners 70 will be effective from a position above the ware on platforms 56, acting in the main as radiant heat. Heat from the bottom burners 71 may be transmitted by convection, or conduction, or by heating platforms 56 to produce radiant heat directed at the surfaces of the ware facing downwardly.

For providing effective boundaries for the zones to be described, bottom and top burners may be divided into groups regulated by separate controls to produce separately controlled temperatures at the different zones, as desired. The zones set up depend upon the type of operation sought. In the case here, where glost firing is to be considered, the zones will be defined in relation to the end product desired.

Suitable dampers or baffles 75 (FIG. 1) may be disposed for dividing tunnel 14 into a heating section 76, separated from a cooling section 77. The positioning of baffles 75 will be determined, in each case, by the end result to be attained. In this case, baffle 75 is shown as approximately two-thirds of the length of the kiln from the entrance end. However, for certain purposes, this dimension has been found, in actual operation, not to be critical.

For instance, for certain purposes, it has been found that the ware may be withdrawn completely from within the tunnel almost immediately after the ware has attained its maximum temperature. In such case, a body of relatively cool air may be caused to move toward the entrance end of the tunnel by means such as a blower 79, which may be located at any suitable position with relation to the extent of the tunnel. In the case here shown, the blower is located at the exit end of the tunnel. This blower may deliver air either at the exit end at which the blower is located, or to tuyeres 81 between baffles 75 and the entrance end of the tunnel. In one instance here being described, tuyeres or ducts 81 may be located entirely at the position defined by baffles 75. Thus, quick cooling of the ware occurs immediately that the ware passes baffles 75. A number of tuyeres or ducts may be positioned between baffles 75 and the exit end of the tunnel, for the purpose of producing a sharp reduction in the temperature of the ware immediately after it has reached the maximum maturing temperature which the ware is expected to attain during the fast firing cycle.

Exhaust flues 78 may be provided where necessary in the roof of the kiln at the hot area between the entrance to the tunnel and baffles 75. Such flues may, by being connected to a blower such as blower 79, also be utilized to cause movement of heated air reversely of the movement of the cars through the tunnel to the entrance end.

Burners 80 may be disposed in return reach 22 to preheat platforms 56 as they hang downwardly so that, as they move to the loading position just outside the entrance to heating section 76, the ware will be subjected immediately to heat from a relatively hot body.

Figure 9:
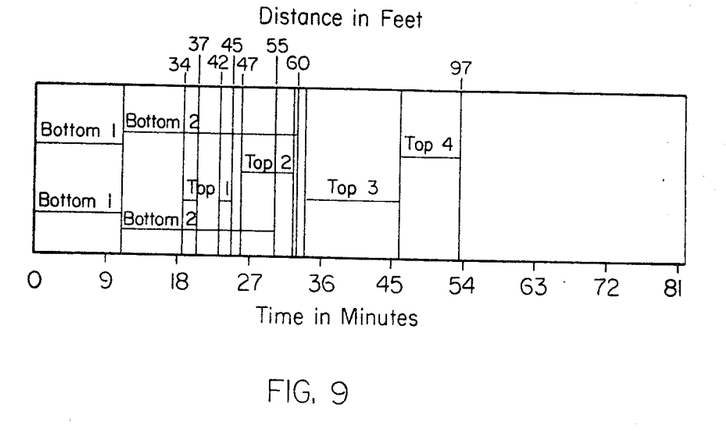
FIGS. 9 and 10 are graphs, illustrating a mode of operation of the kiln used in the invention.
Figure 10:
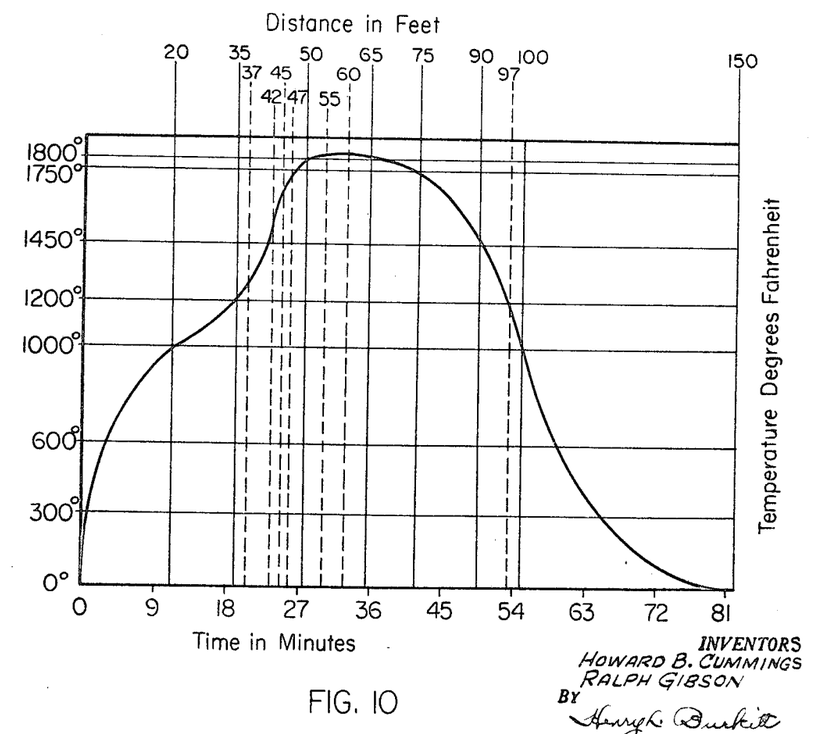

One cycle of heating and cooling is illustrated graphically in FIGS. 9 and 10. In the instance there, the heating section of the tunnel has been divided into five temperature zones from the entrance end to baffles 75. In the first zone, heat may be directed by burners 71 to the under side of the ware on the platforms, so that the ware may be heated rapidly to a temperature of about 1000° F., which may be related to the quartz inversion temperature of approximately 1063.4° F. In the second zone, heat from the bottom burners may be utilized to bring the ware up past the quartz inversion temperature, to about 1200° F. After the quartz inversion temperature has been passed successfully, rapid heating may ensue again in the third zone, to bring the temperature up to about 2000° F. to 2100° F. At this point, the problem of the ingredients of body and glaze becomes important for consideration in connection with the process.

The time intervals indicated upon the charts (FIGS. 9 and 10) are one possible consideration. The problem is to relate the constituents for the bisque body and the constituents of the glaze to each other, and the fast moving changes in structure as the bisque body and the glaze both are brought rapidly up to the peak maturing temperature for the glaze. In this connection, it has been found that, for certain features of obtaining a proper glaze, the continued maintenance of the ware at the peak maturing temperature over a period of time is, in the cases here considered, either undesirable, or unnecessary, or both. Thus, properly to coordinate the variables involved, for fast firing, it has been found requisite to include certain ingredients in the preparation of the body for the bisque to be produced for bisque firing. In this respect, it has been determined that it is important to increase the coefficient of expansion of the fired bisque body. It has been found that a combination of fluxes will react with a glass former and produce the desired control of the coefficient of thermal expansion so that, on cooling, a "fit" would be obtained with the coefficient of thermal expansion of the glaze. Thus, a non-silicate flux would be used, in very small quantities, with very small quantities of a silicate flux. Some non-silicate fluxes which are available for the production of this result are alkaline earth carbonates such as magnesium carbonate and calcium carbonate. The silicate fluxes include alkali or alkaline earth silicates such as talc, spodumene, petalite and wollastonite. It is necessary to point out that the quantities involved are small. For instance, where lithium-bearing compounds are indicated, their weight is in the proportion of between one and three percent. Of the total weight of the ingredients of the mixture from which the body for the bisque to be produced was formed and this preparation was found to react with the glassy phase of the body to produce a desired increase in expansion of the body for the proper cooperation both with the fast fire and with the properties of the glaze. Of the lithium compounds useful for the purpose here sought, particular benefits were derived from the use of compounds such as spodumene and petalite. An example of the components of a mixture effective in producing a bisque body which, in the glost fire, had the desired and adequate expansion to cooperate with the glaze, is as follows:

|  | Percent |
|---|---|
| Silica | 38.5 |
| Feldspar | 16.0 |
| Calcium carbonate | 2.5 |
| Spodumene | 1.0 |
| Ball clay | 10.0 |
| China clay | 22.0 |
| Kaolin | 10.0 |
|  | 100.0 |

Spodumene is indicated here as an example of a lithium-bearing compound capable of assuring the results desired. As indicated, other lithium-bearing compounds may be substituted for spodumene. For instance, petalite was found to produce effects comparable to those derived from spodumene.

A formula for a composition, where there is used a silicate other than one in the lithium family, is as follows, the amounts indicated being percentages by weight of the total ingredients:

| | Percent |
|---|---|
| Silica | 38.5 |
| Feldspar | 16.0 |
| Calcium carbonate | 2.5–1.0 |
| Talc | 1.0–2.5 |
| Ball clay | 10.0 |
| China clay | 22.0 |
| Kaolin | 10.0 |
| | 100.0 |

It is to be noted that the total amount of silicate (spodumene or talc, in one case), and non-silicate (calcium carbonate, in another case), is small. Within that total, the range of change of the silicate and the non-silicate is varied to produce desired combinations which will react, in the formation of the bisque, to produce the desired increase in the coefficient of thermal expansion.

From a composition such as here specified, there is derived a bisque the coefficient of thermal expansion of which is increased from the usual range between $6.0 \times 10^{-6}$ and $7.0 \times 10^{-6}$, to a range between $7.0 \times 10^{-6}$ and $8.0 \times 10^{-6}$.

Where the ingredient added was one such as talc, it could be used in controlled proportions with an ingredient such as whiting. The talc would tend to retain the silica in the body as quartz and raise the coefficient of thermal expansion, while the whiting would counteract this sufficiently to control that increase in the coefficient of thermal expansion within the limits desired to fit the glaze.

The correlation with the time for maturing the glaze, the low temperature at which the glaze is required to mature in the proper cooperation with the bisque, led to the provision of a glaze composition which had certain basic ingredients. Such a glaze must fire to a suitable gloss within the extremely short time of the fast firing cycle; yet it must possess, in the final product, sufficient hardness to withstand the usage to which such ware ultimately will be subjected. Such glaze, for underglaze decoration, must be transparent. A glaze of this type is used on ware on or in which food may be disposed. Therefore, toxicity from lead release must be avoided. In the glost fire, the glazed bisque body must not attain the temperature to which the body was fired in the bisque firing. A direct tie between the effective coefficient of expansion of the glaze, and the coefficient of expansion of the bisque body, to fit the two expansions to each other in the time for reaction, is made essential in this fast firing.

To achieve these purposes, fluorides were introduced into the glaze composition. The introduced fluorides promoted rapid fluidity for the glaze, and gloss, brilliance and smoothness of the glazed surface. In this connection, the formulation here results in a newly observed brilliance of the glaze and the colors under the glaze. But not all fluorides cooperate properly. Although most alkali fluorides were found to be unsuitable for the end results sought, potassium silico-fluoride has been found to be an exception. Alkaline earth metal fluorides did serve these purposes well. A highly successful, yet economical and readily available, fluoride for this purpose is calcium fluoride. In this relation, the alkaline earth metal silico-fluorides also lend themselves to these purposes. One example of a formula which has been found effective for these purposes (in which, in mole equivalents, RO=unity) is as follows:

$K_2O$—0.045  $CaF_2$—0.285
$CaO$—0.087  $Al_2O_3$—0.100
$BaO$—0.066  $B_2O_3$—0.150
$SrO$—0.087  $SiO_2$—2.20
$PbO$—0.430  $ZrO_2$—0.30

This formula is given as an example. Certain optimum limits have presently been defined, although they are not necessarily absolute. Thus, in the columns below, it appears, at present, that the formulations should not exceed the limits set up in column A, but highly desirable results are attained within the limits set in column B:

| | A | B |
|---|---|---|
| $K_2O$ | 0.02–0.06 | 0.04–0.05 |
| $CaO$ | 0.06–0.10 | 0.07–0.09 |
| $BaO$ | 0.04–0.10 | 0.06 0.08 |
| $SrO$ | 0.02–0.10 | 0.07–0.09 |
| $PbO$ | 0.40–0.50 | 0.42–0.44 |
| $CaF_2$ | 0.20–0.30 | 0.27–0.29 |
| $B_2O_3$ | 0.05–0.20 | 0.13–0.17 |
| $Al_2O_3$ | 0.05–0.15 | 0.08–0.12 |
| $SiO_2$ | 1.50–2.50 | 2.15–2.35 |
| $ZrO_2$ | 0.00–0.50 | 0.02–0.04 |

Another formula which has been found satisfactory is as follows:

$MgO$—0.014  $PbO$—0.398
$K_2O$—0.043  $CaF_2$—0.179
$Na_2O$—0.001  $Al_2O_3$—0.099
$CaO$—0.229  $B_2O_3$—0.143
$SrO$—0.073  $SiO_2$—2.14
$BaO$—0.063  $ZrO_2$—0.030

In this connection, in the formula just given, the broad range is set forth, in the formula following, in its column A, while the narrow range is set forth in its column B:

| | A | B |
|---|---|---|
| $MgO$ | 0.000–0.020 | 0.000–0.020 |
| $K_2O$ | 0.000–0.060 | 0.040–0.050 |
| $Na_2O$ | 0.000–0.060 | 0.000–0.020 |
| $CaO$ | 0.060–0.450 | 0.100–0.300 |
| $SrO$ | 0.000–0.100 | 0.050–0.100 |
| $BaO$ | 0.000–0.100 | 0.040 0.090 |
| $PbO$ | 0.325–0.500 | 0.350–0.450 |
| $CaF_2$ | 0.060–0.450 | 0.100–0.300 |
| $Al_2O_3$ | 0.050–0.200 | 0.080–0.120 |
| $B_2O_3$ | 0.050–0.200 | 0.130–0.170 |
| $SiO_2$ | 1.50–2.50 | 2.00–2.35 |
| $ZrO_2$ | 0.000–0.500 | 0.020–0.040 |

Repeated research has demonstrated importance, in the glaze composition, of the relation between the RO, $RO_2$ and $R_2O_3$ groups of the oxides selected in this formulation ("R" referring to the different elements combined with oxygen). Another important relationship was in the relative amounts of $Al_2O_3$, $SiO_2$ and $B_2O_3$. The combined presence of the oxides of calcium, barium and strontium in a glaze has been found to result in high speed in maturing, essential for the high speed of fast firing such as here.

Also, in the research for this glaze composition, it was ascertained that although the normal ratio of $Al_2O_3$ and $SiO_2$ in glazes was between 1:8 and 1:10, the formulation of the glaze here was reduced sharply to be less than 1:10, down to 1:22. Although alkali oxides generally are undesirable, yet the presence of a small quantity of an alkali such as potassium oxide, as here specified, has been found to serve the purposes of producing compatability, particularly in relation to underglaze colors. It is altogether desirable completely to eliminate any of the other alkali oxides. Another relationship found to be of importance in some cases is that between the calcium present as oxide and as fluoride.

In this relation, the presence of a small quantity of potassium has been found effective in promoting the properties indicated. In such an instance, the potassium may be present as silico-fluoride. Formulae for this purpose may be as follows:

|         | A     | B     |
|---------|-------|-------|
| $K_2SiF_6$ | .045  | .045  |
| CaO     | .372  | .197  |
| $CaF_2$ |       | .175  |
| BaO     | .066  | .066  |
| SrO     | .087  | .087  |
| PbO     | .430  | .430  |
| $B_2O_3$ | .150  | .150  |
| $Al_2O_3$ | .100  | .100  |
| $SiO_2$ | 2.155 | 2.155 |
| $ZrO_2$ | .030  | .030  |

Here the potassium is brought into the formulae, in both cases, as silico-fluoride. In Formula A above, all of the fluorine is introduced into the composition by the potassium silico-fluoride. In Formula B, the fluorine is brought in by both calcium fluoride and potassium silico-fluoride. The calcium, however, has been divided between the oxide and the fluoride.

A glaze of this type has been found to fire to an excellent gloss in a glost fire at a temperature between 2000° F. and 2100° F. within the time of the fast fire cycle. Such a glaze has a coefficient of thermal expansion of $6.5 \times 10^{-6}$. The coefficient of expansion of the glaze is thus coordinated with the coefficient of expansion of the bisque body so that the final product is free of crazing. Its lead release was found to be less than 1 part per million, well below the required minimum.

To carry out the process, the ingredients for the bisque body to be produced are prepared in the proportions here indicated, and the body is formed from these ingredients by any suitable method. The formed body is then fired in any usual manner so as to produce the bisque and to prepare it for application of the colors for ornamentation, and then of the glaze. Then the bisque body, so fired, is decorated. Thereafter, the glaze is applied to the decorated body. The body, so decorated, and with the ingredients of the glaze applied, is fed into the fast fire kiln 10 by means such as cars 20. A temperature cycle such as shown in FIGS. 9 and 10 may then be followed.

However, to attain certain additional results, blasts of air at room temperature, or at temperatures sharply below the temperature of the pieces as they move out of the glost fire, or other methods of cooling, may be utilized to bring the heated pieces down from the peak maturing temperature as soon as possible after the peak temperature has been attained. Such peak maturing temperature for the glost fire of pieces here prepared has been found to be effective between 2000° F. and 2100° F.

For cooling, as soon as the glost fired pieces have moved past baffles 75, blasts of relatively cold air may be moved over the pieces sharply to reduce their temperature from the peak maturing temperature. That relatively cold air, by means of the positioning of baffles 75, would be prevented from passing back into heating zone 76, and would move only toward the outlet end of the kiln.

Under other circumstances, baffles 75 may be the boundary for the kiln. The pieces then would pass directly to outside the kiln after passing the baffles, and then would be cooled by blasts of air.

Many other changes could be effected in the particular apparatus, compositions, and methods of use and operation, and in specific details thereof, hereinbefore set forth, without substantially departing from the invention intended to be defined herein, the specific description being merely of embodiments capable of illustrating certain principles of the invention.

What is claimed as new and useful is:

1. A glaze for application to ceramic bisque after the bisque firing has been completed and before glost firing in a process of fast firing, the glaze comprising compounds based on the oxides of calcium, barium, strontium and aluminium, silica, and a fluoride, wherein the ingredients are present in the proportions and within the limits specified, wherein, in mole equivalents, RO=unity, in the following amounts:

| $K_2O$ | 0.02–0.06 |
|---|---|
| CaO | 0.06–0.10 |
| BaO | 0.04–0.10 |
| SrO | 0.02–0.10 |
| PbO | 0.40–0.50 |
| $CaF_2$ | 0.20–0.30 |
| $B_2O_3$ | 0.05–0.20 |
| $Al_2O_3$ | 0.05–0.15 |
| $SiO_2$ | 1.50–2.50 |
| $ZrO_2$ | 0.00–0.50 | wherein the ratio of $Al_2O_3$ to $SiO_2$ is less than 1:10.

2. A glaze for application to ceramic bisque after the bisque firing has been completed and before glost firing in a process of fast firing, the glaze comprising compounds based on the oxides of calcium, barium, strontium and aluminium, silica, and a fluoride, wherein the ingredients are present in the proportions and within the limits specified, wherein, in mole equivalents, RO=unity, in the following amounts:

| $K_2O$ | 0.04–0.05 |
|---|---|
| CaO | 0.07–0.09 |
| BaO | 0.06–0.08 |
| SrO | 0.07–0.09 |
| PbO | 0.42–0.44 |
| $CaF_2$ | 0.27–0.29 |
| $B_2O_3$ | 0.13–0.17 |
| $Al_2O_3$ | 0.08–0.12 |
| $SiO_2$ | 2.15–2.35 |
| $ZrO_2$ | 0.02–0.04 | wherein the ratio of $Al_2O_3$ to $SiO_2$ is less than 1:10.

3. A glaze for application to ceramic bisque after the bisque firing has been completed and before glost firing in a process of fast firing, the glaze comprising compounds based on the oxides of calcium, barium, strontium and aluminium, silica, and a fluoride, wherein the ingredients are present in the proportions and within the limits specified, wherein, in mole equivalents, RO=unity, in the following amounts:

| MgO | 0.000–0.020 |
|---|---|
| $K_2O$ | 0.000–0.060 |
| $Na_2O$ | 0.000–0.060 |
| CaO | 0.060–0.450 |
| SrO | 0.000–0.100 |
| BaO | 0.000–0.100 |
| PbO | 0.325–0.500 |
| $CaF_2$ | 0.060–0.450 |
| $Al_2O_3$ | 0.050–0.200 |
| $B_2O_3$ | 0.050–0.200 |
| $SiO_2$ | 1.50–2.50 |
| $ZrO_2$ | 0.000–0.500 | wherein the ratio of $Al_2O_3$ to $SiO_2$ is less than 1:10.

4. A glaze for application to ceramic bisque after the bisque firing has been completed and before glost firing in a process of fast firing, the glaze comprising compounds based on the oxides of calcium, barium, strontium and aluminium, silica, and a fluoride, wherein the ingredients are present in the proportions and within the limits specified, wherein, in mole equivalents, RO=unity, in the following amounts:

| | |
|---|---|
| MgO | 0.000–0.020 |
| $K_2O$ | 0.040–0.050 |
| $Na_2O$ | 0.000–0.020 |
| CaO | 0.100–0.300 |
| SrO | 0.050–0.100 |
| BaO | 0.040–0.090 |
| PbO | 0.350–0.450 |
| $CaF_2$ | 0.100–0.300 |
| $Al_2O_3$ | 0.080–0.120 |
| $B_2O_3$ | 0.130–0.170 |
| $SiO_2$ | 200–2.35 |
| $ZrO_2$ | 0.020–0.040 | wherein the ratio of $Al_2O_3$ to $SiO_2$ is less than 1:10.

References Cited
UNITED STATES PATENTS

| | | | |
|---|---|---|---|
| 1,783,740 | 12/1930 | McKeown | 106—49 |
| 1,848,567 | 3/1932 | Kinzie | 106—49 |
| 2,294,931 | 9/1942 | Paquet | 106—49 |
| 2,334,043 | 11/1943 | Staley et al. | 106—49 |
| 2,972,543 | 2/1961 | Beals et al. | 106—49 |

JAMES E. POER, Primary Examiner

UNITED STATES PATENT OFFICE
CERTIFICATE OF CORRECTION

Patent No. 3,510,324 May 5, 1970

Howard B. Cummings et al.

It is certified that error appears in the above identified patent and that said Letters Patent are hereby corrected as shown below:

In the heading to the printed specification, line 4, "Interspace" should read -- Interpace --.

Signed and sealed this 22nd day of December 1970.

(SEAL)
Attest:

Edward M. Fletcher, Jr.            WILLIAM E. SCHUYLER, JR.
Attesting Officer                 Commissioner of Patents